INVENTOR
ERIC WINSTON

BY
Hopgood & Calimafde
ATTORNEYS.

3,537,065
               MULTIFERRULE CABLE CONNECTOR
Eric Winston, Melrose Park, Pa., assignor to Jerrold
   Electronics Corporation, Hatboro, Pa., a corporation
   of Delaware
           Filed Jan. 12, 1967, Ser. No. 608,915
                   Int. Cl. H01r 13/36
U.S. Cl. 339—177                                   1 Claim

ABSTRACT OF THE DISCLOSURE

A cable connector and mechanism for locking a cable end therein. A cylindrical unitary structure comprised of a pair of adjacent L-shaped ferrules fits around the cable end which is inserted into the connector. A locking sleeve threads into the connector and against the unitary structure, causing the ferrules to shear apart and contract around the cable.

---

This invention relates to cable connectors and in particular, to a locking assembly for use in connecting a coaxial or similar cable to a cable housing.

The invention provides a means for locking an end of a coaxial cable to a cable junction, wherein the cable is held in place by at least one deformable annular ring or collar, or ferrule, circumferentially secured to said cable at said junction.

In the community antenna systems, as in other systems employing cables, means are required for connecting cables at various cable junctions. In such connections, it is desirable to preserve the electrical characteristics of the cable while providing a secure fitting from which the cable cannot be withdrawn and which will be impervious to weather.

Connectors in use typically consist of slotted rings which do not provide a completely circumferential grip and tend to wrinkle the cable shielding thereby damaging the shielding and changing its impedance. The electrical contact achieved in installations of prior locking mechanisms was not always entirely satisfactory, due to the failure of such mechanisms to cut through the oxidation on the shielding. In addition, problems which sometimes arose with such connectors were movement within the connection which produces rattle and abrasion of the junction, loss of grip upon the cable, and possible breaking of the connection.

This invention is an improvement over prior connectors by providing, in a simplified and convenient form, means for obtaining a more positive grip upon the cable with superior grounding and minimum distortion of the shielding, while simultaneously holding the cable end in precise position and providing weatherproof protection for the junction.

Accordingly, it is an object of this invention to provide a cable connector which embodies the above improvements.

Another object of the invention is to provide means for automatically locking a cable end in place as the connection is secured.

A further object of this invention is to provide a locking assembly for locking a cable end into a connection with a minimum of distortion.

A further object of this invention is to provide means for simply and easily locking a cable into a connection, in a manner which allows a minimum of movement or abrasion.

Another and further object of this invention is to provide a means for locking coaxial cables into a connection with a minimum of distortion to the cable shield while affording said shield an excellent connection to the housing for grounding or other desired bias.

A still further object of the invention is to render the connection impervious to the elements of the weather.

The above-mentioned and other features of this invention will become more apparent and the invention itself will best be understood by reference to the following description of embodiments of the invention taken in conjunction with the accompanying drawing, wherein.

Figure 1:
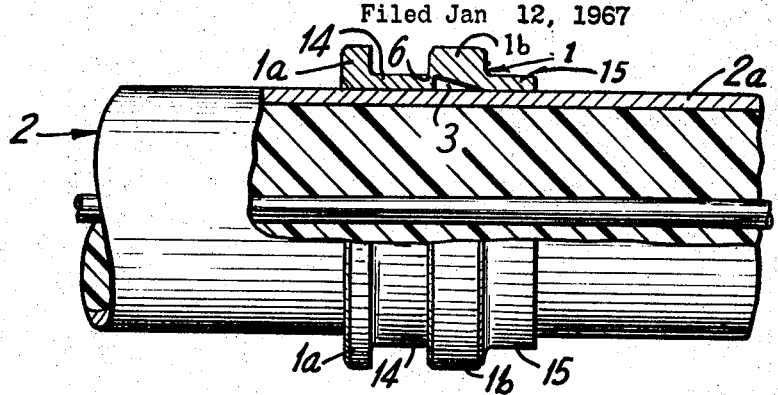
FIG. 1 is a plan view of an end of coaxial cable depicting the locking mechanism of this invention.

The preferred embodiment of the invention, as set forth in the preceding drawing, is comprised of a grooved cylindrical unitary structure 1 of aluminum or other deformable material so designed that when axially loaded it shears annularly and forms two adjacent L-shaped collars or ferrules 1a and 1b. This structure is sized to and is slid into position upon the cable 2. The housing 9 containing a bore 11 of approximately the size of the cable, provides a receptacle for the end thereof. The open end of bore 11 is flared outwardly to form a beveled cam surface 10 to guide the unitary structure 1 into contact with the cable shielding 2a as the connection is made. A locking sleeve or nut 7, through which the cable 2 passes, connects with housing 9 through mating threads, such that when tightened, it axially compresses the unitary structure 1 between its shoulder 8 and the beveled cam surface 10 to complete the connection as follows.

As the locking sleeve or nut 7 is advanced into housing 9, its shoulder 8 acts axially upon the unitary structure 1 forcing it along cable 2 and into contact with the beveled cam surface 10. As the installation proceeds, the axial leg 15 of collar 1b rides down the beveled cam surface 10 of housing 9. Upon reaching the cable, it bites into the shielding exposing a fresh surface thereby assuring the desired electrical contact. Similarly, the axial leg 14 of collar 1a rides under or telescopes within collar 1b and in so doing, is pressed into the cable shielding 2a by bevel 3 under collar 1b.

Figure 3:
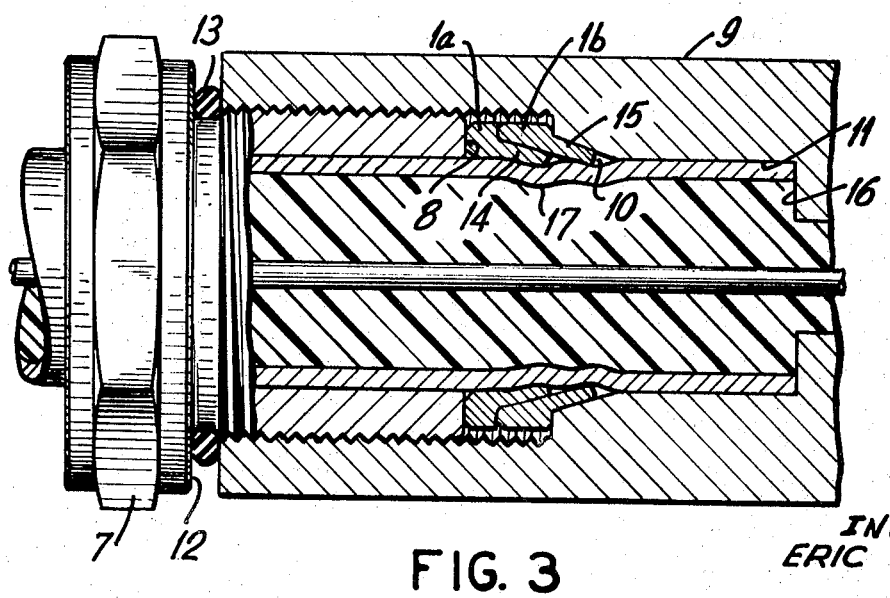
FIG. 3 is a plan view of the completed connection.

The bore 11 is terminated at the closed end by a shoulder 16, against which the end of cable 2 abuts as the locking mechanism described above reacts to the tightening of locking sleeve 7. As can be seen from FIG. 3, when the installation is completed, the cable shielding is slightly deformed (17). These slight depressions appear where the ferrules constrict about the cable, and contribute to the effectiveness of the junction. This results in two circumferential grips upon the cable doubly assuring excellent electrical contact, and the creation of an effective barrier against the entry of moisture. The distortion of the cable shielding is minimal, consistent with the degree of positive locking achieved and the resulting effect upon its electrical properties is negligible.

The connection is made weatherproof by the sealing of locking sleeve 7 to the housing 9 and to the cable 2. This is accomplished by the use of an elastic ring-type seal 13 between the shoulder 12 and the housing 9 to protect the threads, and by the mating of the surfaces between the shoulder 8, the collars 1a and 1b, and the cable shielding 2a.

Although the locking assembly described with respect to the drawing uses in effect two adjacently arranged deformable rings, it will be appreciated that any number may be employed.

Figure 2:
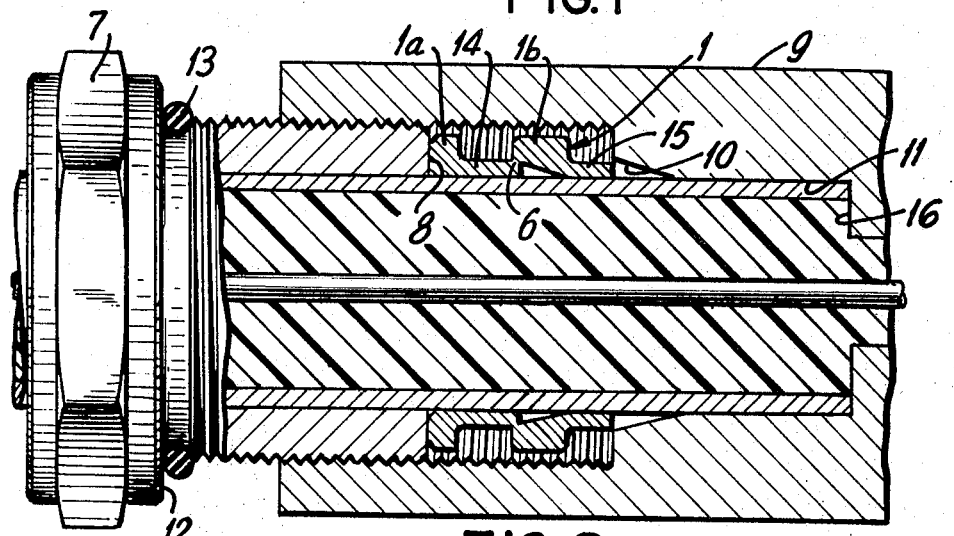
FIG. 2 is a plan view of said end of coaxial cable inserted into the receiving portion of the connector with the locking mechanism in position prior to the complete assembly thereof.

In this connection, it is important that the area of shear 6 (FIG. 2) within the unitary structure be of such dimensions that shearing will not occur until the axial leg 15 of collar 1b has moved down cam surface 10 and into contact with cable 2. Shearing prior to the seating of the ferrule ahead would result in an undesired imbalance in the gripping effect of the ferrules. Such shearing areas will be determined by the characteristics of the material used. By way of example, if 20–11T3 Aluminum is the material used, the lateral thickness of the shear area 6 must fall within .007" and .016".

While the principles of the invention have been described in connection with the above specific apparatus, it is to be clearly understood that this description is made only by way of example and not as a limitation to the scope of the invention as set forth in the accompanying claims.

What is claimed is:

1. A coaxial cable connector and assembly for locking a coaxial cable end therein, comprising:
   a housing having a bore therein, sized to receive a particular gauge coaxial cable and terminating at a closed end of said housing;
   a coaxial cable with an end thereof positioned within said bore to abutt the closed end of said housing;
   an annular shoulder at the cable receiving end of said bore beveled to create a flared bore opening;
   a second bore in said housing extending from an open end of the housing to said shoulder and having threads in the periphery thereof;
   a unitary structure having a substantially cylindrical bore therethrough slidably fitted upon the coaxial cable, said unitary structure comprising first and second complementary locking ferrules, said ferrules each having a sleeve portion fitted upon the cable and an upstanding flange portion at one end of the outer surface of the sleeve portion thus providing each ferrule with a substantially L-shaped cross section, the first ferrule integrally joined by a shear area at its flanged end to the non-flanged end of the second ferrule, the sleeve portion of said first ferrule having a beveled recess formed at the flanged end thereof in the face of the substantially cylindrical bore to provide said shear area, said beveled recess sloping away from the shear area toward the sleeve portion of the first ferrule so that when the area is sheared the first ferrule will ride upwardly upon the outer surface of the sleeve portion of the second ferrule;
   an actuating sleeve adapted to slidably fit upon the cable, thread into the second bore of said housing, and thereby exert an axial force upon said unitary structure;
   said unitary structure riding upon the cable between said actuating sleeve and the flared opening of the first bore of said housing, the sleeve portion of said first ferrule sized and positioned to enter the flared opening so that when said actuating sleeve is threaded into said housing and against said unitary structure, the sleeve portion of said first ferrule is wedged into said flared opening until the flanged portion of said first ferrule engages the annular shoulder of the housing;
   the length of the outer surface of the sleeve portion of said first ferrule between the end of the ferrule and the face of the flange formed such that the end of the ferrule wedged into the flared opening will bear inwardly against the outer surface of the coaxial cable thus locking the cable in place with a minimum of distortion to the cable shield while affording an excellent connection to the housing for grounding said cable;
   the length of the outer surface of the sleeve portion of said second ferrule between the end of the ferrule and the flange formed such that the flanged portion of the first ferrule wedges against the face of the flange of said second ferrule after said shear area is sheared apart by force generated from the actuating sleeve and when said actuating sleeve is threaded into said housing to its fullest extent, the end of the sleeve portion of said second ferrule thus caused to bear inwardly against the outer surface of said coaxial cable due to the forces generated from the wedging action of the first ferrule riding upon the outer surface of the sleeve portion of said second ferrule;
   the length of said outer surface of said second ferrule sized to terminate said wedging action prior to disruption of the cable shield but subsequent to locking the cable in place with a minimum of distortion to the cable shield while affording a second excellent connection to the housing for providing a ground for said coaxial cable.

References Cited

UNITED STATES PATENTS

| | | | |
|---|---|---|---|
| 2,352,159 | 6/1944 | Brodie | 339—94 |
| 2,821,567 | 1/1958 | Bergan | 339—177 X |
| 2,995,388 | 8/1961 | Morello et al. | 339—177 |
| 3,022,482 | 2/1962 | Waterfield et al. | 339—94 X |
| 3,109,052 | 10/1963 | Dumire et al. | 339—177 X |
| 3,215,457 | 11/1965 | Teeters | 285—282.7 X |

FOREIGN PATENTS

| | | |
|---|---|---|
| 595,259 | 3/1934 | Germany. |
| 925,028 | 3/1955 | Germany. |

RICHARD E. MOORE, Primary Examiner

U.S. Cl. X.R.

339—276